(12) United States Patent
Hurtado Aznar et al.

(10) Patent No.: US 7,767,015 B2
(45) Date of Patent: Aug. 3, 2010

(54) BITUMEN EMULSION-BASED COMPOSITION

(75) Inventors: Javier Hurtado Aznar, Madrid (ES); Didier Lesueur, Madrid (ES); Jean-Valery Martin, Hopewell, NJ (US); David Monin, Paris (FR)

(73) Assignees: Eurovia, Rueil-Malmaison (FR); Innophos, Inc., Cranbury, NJ (US)

( * ) Notice: Subject to any disclaimer, the term of this patent is extended or adjusted under 35 U.S.C. 154(b) by 0 days.

(21) Appl. No.: 12/067,916

(22) PCT Filed: Sep. 21, 2006

(86) PCT No.: PCT/FR2006/002161
§ 371 (c)(1), (2), (4) Date: Sep. 10, 2008

(87) PCT Pub. No.: WO2007/034081
PCT Pub. Date: Mar. 29, 2007

(65) Prior Publication Data
US 2009/0064898 A1    Mar. 12, 2009

(30) Foreign Application Priority Data
Sep. 22, 2005    (FR) .................................. 05 09695

(51) Int. Cl.
*C08L 95/00*    (2006.01)
*C09D 195/00*    (2006.01)

(52) U.S. Cl. ...................................... 106/277; 106/246
(58) Field of Classification Search ................. 106/277, 106/246
See application file for complete search history.

(56) References Cited

U.S. PATENT DOCUMENTS

| 4,209,337 | A  |   | 6/1980  | Wagner et al. |         |
|-----------|----|---|---------|---------------|---------|
| 5,558,702 | A  | * | 9/1996  | Chatterjee et al. | 106/277 |
| 5,667,576 | A  | * | 9/1997  | Chatterjee et al. | 106/277 |
| 5,667,577 | A  | * | 9/1997  | Chatterjee et al. | 106/277 |
| 5,928,418 | A  |   | 7/1999  | Tamaki et al. |         |
| 6,258,161 | B1 | * | 7/2001  | Kerkar et al. | 106/808 |
| 6,302,955 | B1 | * | 10/2001 | Kerkar et al. | 106/802 |
| 6,540,822 | B2 | * | 4/2003  | Wates et al.  | 106/277 |
| 6,840,991 | B2 | * | 1/2005  | Honma et al.  | 106/277 |

FOREIGN PATENT DOCUMENTS

RO    119953 B1    6/2005

* cited by examiner

*Primary Examiner*—Helene Klemanski
(74) *Attorney, Agent, or Firm*—Browdy and Neimark PLLC

(57) ABSTRACT

The invention concerns a bitumen emulsion-based surfacing composition or bituminous mix consisting of an amphoteric surfactant and its use in road highway engineering for making materials for new roads, for reinforcing or maintaining old roads or for punctually repairing same.

10 Claims, No Drawings

BITUMEN EMULSION-BASED COMPOSITION

The invention relates to a paving composition or bitumen emulsion-based bituminous coating constituted by an amphoteric surfactant and its use in highway engineering for producing materials for new carriageways, for reinforcing or maintaining existing carriageways or for spot repairs.

Bitumen emulsions are regularly used in highway engineering for various applications where they are spread either alone in order to obtain for example bonding courses, impregnation courses and spot repairs (patching, joints, crack filling) or in the presence of aggregates for carrying out surface dressings or cold coatings.

For better understanding of the invention, it seems useful to give the following definitions:

by bitumen is meant a highway bitumen or any bitumen-based composition containing optionally one or more polymers and/or one or more acids or bases and/or one or more emulsifiers and/or one or more viscosifiers and/or one or more fluxing agents and/or one or more plastifiers and/or any other additive making it possible to modify the properties of the composition;

by bitumen emulsion, is meant an aqueous dispersion of bitumen containing optionally one or more additives and/or one or more emulsifiers and/or one or more viscosifiers and/or one or more fluxants and/or one or more plastifiers and/or any other additive making it possible to modify the properties of the emulsion.

by bituminous coating, is meant a mixture of aggregates graded by size and a bitumen comprising optionally one or more additive(s), for example organic or mineral fibres, crumb rubber, optionally originating from recycling of used tyres, various wastes (cables, polyolefins, etc) as well as their mixtures in all proportions;

by aggregates is meant aggregates of various origins, including the aggregates originating from quarries or gravel pits, the products of recycling such as the aggregates originating from the milling of old road surfacing, manufacturing waste, the materials originating from the recycling of construction materials (demolition concrete, etc), slags, shales, artificial aggregates of any origin and deriving for example from household refuse incineration clinker (HRIC), as well as their mixtures in all proportions;

by cold coatings is meant any mixture obtained by mixing a bitumen emulsion and aggregates, dry or not, optionally in the presence of water added in addition to that of the emulsion and that naturally present in the aggregates, and additives which can be the same as those generally used in bituminous coatings, but also more specific additives intended in particular to control the breaking of the emulsion, such as for example breakers which can be chosen for example from acids or bases, mineral additives such as hydraulic cement (Portland, pozzolanas, Sorel cements, etc), lime, or mineral salts as well as retarding agents, which can also be mineral salts or organic compounds such as for example acids, bases or surfactants, agents such as salts or their acid phosphates, phosphonates and phosphinates and/or polyphosphates, mineral and/or organic. Said cold coatings can for example be obtained by mixing a bitumen emulsion and a wet or dry aggregate in various proportions. Generally the mixture makes it possible to obtain eventually between 0.1 and 30 parts by mass of bitumen per 100 parts of dry aggregate (i.e. 0.1-30 parts percent recorded as pph) and preferably between 2 and 15 pph according to the applications.

Non-exhaustively, examples of "cold coatings" are "cold-cast coatings", "grave emulsion", "cold open or dense coatings", "cold bituminous concretes", or also "cold recycling". The cold coating is intended to bear an average traffic load of the order of 10 to more than 5000 heavy goods vehicles per day, for durations comprised between a few years to 30 years, according to its purpose and its position in the carriageway (wearing course, base course, reprofiling, reinforcement of an old carriageway, etc.).

by cold cast coating (Microsurfacing—MS) is meant highway materials as described in the information sheet from the Service d'Etudes Techniques des Routes and Autoroutes (SETRA) of the Direction des Routes du Ministère de l'Equipement (Note d'Information Chaussées Dépendances n°102 "Les enrobés coulés à froid" of June 1997), such as a mixture of "un-dried aggregates coated with bitumen emulsion and used immediately after production in a very thin layer", or also in the guidelines published in May 2003 by the International Slurry Surfacing Association (Annapolis, Md. USA, particularly in sections 7 ("recommended performance guidelines for emulsified asphalt slurry seal") or 9 ("recommended performance guidelines for micro-surfacing".).

Microsurfacing will here denote all the variants of this technology, for example the Slurry Seals (SS) also described in the SETRA information sheet cited. Typically, and non-restrictively, they have a maximum aggregate size varying between 2 and 20 mm, a mineral skeleton optionally having a discontinuity and residual bitumen contents between 4 and 12 pph.

by cold recycling, is meant the bitumen emulsion technique described in detail in various publications, for example the guide entitled "Recyclage des Chaussées", published in 2003 by the Comité Technique 7/8 "Chaussées Routierès" of the Association Internationale Permanente du Congrès de la Route (AIPCR), headquartered at Paris La Défense. Information sheets from SETRA (Notes d'Informations Chaussées Dépendances n°42 "Retraitement des chaussées à l'émulsion de bitume" of April 1988 and n°42 "Retraitement des chaussées à l'émulsion de bitume" of April 1988) also define the process. This process consists of milling an old carriageway in order to use the milling residue as the aggregate for a new bitumen emulsion coating. This process can becarried out either in-situ (on-site recycling) or at a coating plant, optionally with the addition of new aggregates in any proportion and the addition of various additives. Among the usable additives can be mentioned in particular those which can be added to any cold coating but also more specific additives such as so-called regeneration binders which, in a mixture with the old bitumen covering the milling residue, make it possible to reconstitute a bitumen closely related to a binder used in a new carriageway.

The cold coatings are generally considered inferior to so-called "hot" coatings where the bitumen is fluidified by an increase in temperature, then mixed with aggregates, due to their poorer mechanical properties, which limits them essentially to low-traffic roadways.

The cold coatings have recognized ecological advantages over their hot counterparts. Firstly, they make it possible to dispense with the stage of drying the aggregates which is indispensable for the hot coatings, constituting a significant energy saving, in addition to the avoidance of damaging effects for the atmosphere (dusts and pollution associated with heating). Further, they make it possible to avoid the fume emissions associated with heating of the bitumen during coating and spreading, reducing nuisance to both workers and residents.

The cold coatings have mechanical properties which develop over time, due to the breaking of the emulsion, i.e. the passage from an initial condition where the bitumen is dispersed in the form of fine droplets in an aqueous phase (emulsion) to a final condition where the bitumen constitutes a film coating the aggregates. This arises not only from the presence of water to be removed, but also from the complex interactions between the emulsion and the aggregate. Consequently the sometimes very lengthy periods required for the material to set, before re-opening to traffic, cause increased inconvenience to users. These problems are still more acute during use in cold weather, when the period before re-opening to traffic can become extremely long, to the point of preventing the use of these techniques for work requiring a limit on closure time for the user. However, it would not be possible to use an emulsion which breaks immediately on contact with the aggregates. In fact, the kinetics of the emulsion breaking must allow the coating to be used and therefore give a sufficient workability to the coating between its leaving the mixer and the moment when it is used on the carriageway. The period of workability is largely a factor of the chosen system of production/use. By way of example, it is typically between 30 seconds and 2 minutes for the Microsurfacing machines where the product exits directly from the mixer installed on the free-standing machine to be fed directly to the spreading device positioned at the rear. It is several hours for the cold coatings produced in a coating plant installed at a distance from the spreading site, the transport being carried out by lorry. The period of workability then corresponds to the transport time between the plant and the site of use. A cold coating must therefore fulfil two conflicting requirements: breaking deferred sufficiently to allow use, but then very quick to allow rapid opening to traffic. These contradictory demands make the formulation of cold coating difficult, and it is generally necessary to resort to additives controlling the breaking.

Bitumen emulsions generally comprise between 50 and 72% by weight of bitumen and can optionally contain one or more additives and a complement of an aqueous phase type which can contain optionally one or more emulsifiers and/or additives.

Cationic emulsions are known, i.e. obtained with an emulsifying agent comprising one or more ionic groups having a positive electric charge. These emulsifiers generally involve working in an acidified environment at pH values which, usually and non-limitatively, can reach 1.5 to 3.

Anionic emulsions are also used, and are obtained with an emulsifying agent comprising one or more ionic group(s) having a negative electric charge. This generally involves working in an alkaline environment at pH values which can usually reach 10 to 12.

Emulsions also exist which are based on other types of emulsifiers, such as non-ionic or amphoteric. The non-ionic emulsifiers do not have an ionic group and the amphoteric ones have both cationic and anionic groups depending on the conditions. These emulsifiers are not used in the cold coatings and their usage is restricted to certain very specific applications which differ markedly both from the field of application of the present invention and the field of its composition.

Thus patent U.S. Pat. No. 4,209,337 describes betaine-based emulsions used in a mixture with cement slurries (mass ratio emulsion/cement between 0.3 and 2), to constitute bitumen-modified cement concretes. This type of use of bitumen emulsions falls outside the field of the composition and applications envisaged by the invention since they relate to cold coatings in which the cement is only an optional additive for which the emulsion/cement ratio is greater than 2.

U.S. Pat. No. 5,928,418 describes paving compositions comprising a bitumen emulsion itself comprising a surfactant combined with a polyphenolic compound and a compound chosen from anionic polymeric dispersants and hydrocarboxylic acids or their hydrosoluble salts, and to a compound chosen from saccharides, polyhydric or sugar alcohols.

U.S. Pat. Nos. 5,558,702, 5,667,576, 5,667,577 and WO 96/30,446 describe mixtures of emulsions/fillers comprising fillers such as fibres, clays, limes, sand or mixtures of these components, which have a high stability for producing usable storable slurries which can then be used for waterproofing work, for example for garage or car park ramps. These preparations cannot be confused with cold coatings, as they do not have the typical proportions, they are stored for several months after production and set in periods of the order of a few hours and are not called upon to bear heavy traffic. The present invention aims to solve the problems of the cold coating formulations described in the prior art by proposing an emulsion formula which allows a more rapid increase in cohesion, which makes it possible to reduce significantly the time before reopening to traffic, while retaining an adequate workability.

In fact, surprisingly, the Applicant has discovered that the incorporation of a bitumen emulsion based on certain amphoteric emulsifiers in the formulation of a cold coating, makes it possible to obtain excellent control of the rheological properties of the coating, in particular its initial workability, ensuring easy use, followed by rapid setting, guaranteeing quick opening to traffic.

Thus the subject of the invention is a paving composition constituted of:
i) from 0.5 to 30%, preferably 2 to 15% by weight of a bitumen emulsion itself constituted of:
a. from 0.1 to 3%, preferably 0.5 to 1.5%, by weight of an amphoteric surfactant chosen from the products of formula (I) or (II)

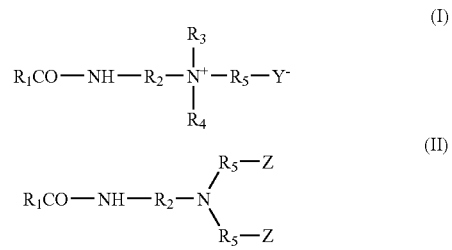

in which:
$R_1$ represents a linear or branched, saturated or unsaturated aliphatic group having 6 to 24 carbon atoms;
$R_2$ is a linear or branched, saturated or unsaturated aliphatic group having 2 to 6 carbon atoms, at least one of these carbon atoms being, if appropriate, substituted by a hydroxy group;
$R_3$ and $R_4$, identical or different, represent a linear or branched, saturated or unsaturated aliphatic group, comprising from 1 to 4 carbon atoms;
$R_5$, identical or different, is a linear or branched, saturated or unsaturated aliphatic group comprising from 1 to 6 carbon atoms, one at least of these carbon atoms being, if appropriate, substituted by a hydroxy group;
$Y^-$ is an $SO_3^-$ or $COO^-$ group;
Z, identical or different, is an $SO_3^-$ or $COO^-$ or $OH$ group;
b. from 30 to 95%, preferably from 45 to 80% by weight of bitumen; and
c. water in sufficient quantity to make up the emulsion (QSF 100%);
ii) from 70 to 99.5%, preferably from 85 to 98% by weight of aggregates;
iii) from 0 to 20% by weight, preferably between 1 and 15%, of total water.

According to the invention, by total water is meant the total water content, including that already present in the emulsion, already present in the aggregates and optionally added (called "additional water" or "added water").

In respect of the linear or branched, saturated or unsaturated, aliphatic group having from 1 to 24 carbon atoms occupying the position $R_1$ to $R_5$, can be mentioned for example the radicals of synthetic origin: methyl, hydroxymethyl, ethyl, propyl, isopropyl, hydroxypropyl, propylene, isopropylene, butyl, isobutyl, pentyl, isopentyl, hexyl, heptyl, octyl, nonyl, decanoyl, dodecanoyl, isotridecyl, and the radicals of natural origin: capric, caprylic, lauric, myristic, palmitic, stearic, behenic, oleic, ricinoleic, linoleic, linolenic, gadoleic, erucic or a mixture of these different radicals.

According to a preferred embodiment of the invention, $R_1$ represents a mixture of aliphatic radicals derived from coconut oil.

Preferably according to the invention $R_2$ represents a linear group with 3 saturated carbons.

Preferably according to the invention $R_3$ and/or $R_4$ and/or $R_5$ represent a methyl or ethyl radical.

Very preferably according to the invention, the amphoteric surfactant can be chosen from cocoamidopropyl betaine (CAS: 70851-07-9), cocoamidopropyl hydroxysultaine (CAS: 70851-08-0) or sodium cocoamphoacetate (CAS: 68650-39-5).

According to a preferred embodiment of the invention, the amphoteric surfactant of the bitumen emulsion can be a mixture of amphoteric surfactants the $R_1$ radicals of which are aliphatic radicals of vegetable (coconut, palm, olive) or animal origin.

In another particular embodiment of the invention, the composition can moreover comprise additives. In this case, a person skilled in the art will know how to modify the quantities of the different ingredients, while respecting the proportions of bitumen emulsion, aggregates and water stated above.

According to a further preferred embodiment of the invention, the composition can moreover comprise a retarder which can advantageously be a surfactant, particularly a surfactant corresponding to the formulae (I) and/or (II).

This composition makes it possible to dispense with the use of acids and/or alkalis in the formulation of the emulsions, which avoids the in-factory safety problems associated with their use and the risks of burning or corrosion associated with the use of acid or alkali emulsion.

This composition moreover has the advantage of having low toxicity to humans and the environment.

This composition also makes it possible to add to the emulsion any type of latex, i.e. anionic or cationic latex, in order to obtain polymer-modified coatings, without destabilizing the emulsion.

According to the invention, the bitumen used in the emulsion can be any highway bitumen.

According to the invention, the bitumen emulsion can moreover contain any type of additive which makes it possible to control its properties, including viscosifiers, setting regulators or salts, for example calcium, potassium, sodium chlorides or any other calcium, potassium, sodium or magnesium salt. Said emulsion can also be a bitumen emulsion, said bitumen being modified by a polymer, an acid, an alkali, a mineral or organic filler, or by a surfactant, taken alone or in a combination. In this case, a person skilled in the art will know how to modify the quantities of the different ingredients, while respecting the proportions of surfactants and bitumen stated above.

By polymer is meant, for example, indicatively and non-limitatively, styrene and butadiene copolymers in all proportions or copolymers of the same chemical family (isoprene, natural rubber, etc.), optionally crosslinked in situ, copolymers of vinyl acetate and ethylene in all proportions or of the same family (butyl, methyl acetate, etc. and polyolefins), crumb rubber originating from used tyres or also any other polymer commonly used for the modification of bitumens as well as any mixture of these polymers.

As an acid, phosphoric acid and its derivatives, salts and esters, hydrochloric acid and any acid or acid combination can be mentioned for example.

As an alkali, organic and mineral alkalis can be mentioned such as for example polyamines, imidazolines, pyrolidines, soda, lime or also potash.

By mineral or organic filler is meant for example cement, lime, silica or carbon black, organic or mineral fibres.

As surfactant modifying the bitumen, anionic, cationic, non-ionic or amphoteric emulsifiers can be mentioned.

Said emulsion can be produced according to any suitable process, in particular a colloid mill, a static mixer, or by phase inversion.

A subject of the invention is also the use of the composition in a mixture with aggregates for the preparation of cold coatings, particularly those for highway application. Thus, the subject of the invention is the use of the composition in the preparation of cold-cast coatings (MS), cold bituminous concrete (CBC), "grave emulsions", "cold open or dense coatings", or also the preparation of cold recycling.

According to another preferred use of the invention, the cold recycling in place is based on 100% milling residue originating from an old carriageway, and containing between 0.5 and 3% of bitumen emulsion.

Other cold coatings can advantageously be obtained by application of the invention. Non-restrictively, mention can be made of coatings for spot repairing which can either be produced manually or using a mixer optionally mounted on a mobile system, just before their use, itself manual or carried out by a special machine.

A subject of the invention is also a cold-cast coating, consisting of the composition according to the invention, wherein said cold coating is capable of being, as a non-limitative example, a cold-cast coating (MS), a cold bituminous concrete (BBF), "grave emulsions", "cold open or dense coatings" or also cold recycling.

Other characteristics of the invention will become apparent on reading the examples which follow and which are given by way of illustration only, without limiting the invention.

EXAMPLE 1

Preparation of a Cold-Cast Coating Formula for a Wearing Course Applicable Either for a New Carriageway or to Renew the Surface Properties of Old Carriageways For comparison, a standard emulsion complying with the Spanish specifications ECL-2d, hereafter referred to as "emulsion 1", is used to utilize a cold-cast coating corresponding to an MS with a grading of 0/6, standardized in Spain (Lechada Bituminosa Tipo 3 LB-3). The aggregate chosen is sourced from the San Felices quarry in Haro (Rioja—Spain) and its grading curve, compared to that of the LB-3 standard grade, is as follows:

|  | sieve (mm) | | | | | | | |
| --- | --- | --- | --- | --- | --- | --- | --- | --- |
|  | 6.3 | 5 | 2.5 | 1.25 | 0.63 | 0.32 | 0.16 | 0.08 |
| LB-3 | 100 | 85-95 | 65-90 | 45-70 | 30-50 | 18-35 | 10-25 | 7-15 |
| undersize (%) | 100 | 90 | 75 | 60 | 40 | 25 | 17 | 9 |

This emulsion, industrially produced by the company Probisa in its Burgos factory, is comprised 62% of a Nynas bitumen of grade 70/100, 0.35% of a cationic surfactant (fatty polyamine Asfier 208 from Kao) and a sufficient quantity of acid to obtain a pH of the emulsion of the order of 3.

To control the breaking time of the emulsion, it is necessary to use both an aqueous solution of fatty polyamine hydrochloride (dosed at 13.5%), hereafter referred to as Retarder. The formulae of the emulsion 1 and the corresponding microsurfacing (MS 1) are as follows:

| Emulsion 1 (composition by mass): | |
| --- | --- |
| Bitumen Nynas 70/100 | 62.00 |
| Asfier 208 | 0.35 |
| Hydrochloric acid | 0.30 |
| Water qsf | 100.00 |
| MS 1 (composition by mass): | |
| Sand 0/6 from the San Felices quarry in Haro (Rioja - Spain) | 100.00 |
| Water content of the Sand 0/6 | 2.60 |
| Added water | 7.00 |
| Retarder | 0.75 |
| Emulsion 1 (i.e. residual bitumen 7.7) | 12.50 |

This formula was compared to a formula which was identical except that the bitumen emulsion had been replaced by an emulsion 2, this time with an amphoteric emulsifier according to the invention, cocoamidopropyl betaine (CAS: 70851-07-9)

| Emulsion 2 (composition by mass): | |
| --- | --- |
| Nynas bitumen 70/100 | 60.0 |
| cocoamidopropyl betaine (CAS: 70851-07-9) | 0.8 |
| Water qsf | 100.00 |

| MS 2 (composition by mass): | |
| --- | --- |
| Sand 0/6 from the San Felices quarry in Haro (Rioja - Spain) | 100.00 |
| Water content of the Sand 0/6 | 4.40 |
| Added water | 6.00 |
| Retarder | 0.75 |
| Emulsion 2 (i.e. residual bitumen 7.7) | 12.80 |

Furthermore, the formula of MS 2 was modified by addition of a breaking agent Portland cement) and the following formula was also compared:

| MS 3 (composition by mass): | |
| --- | --- |
| Sand 0/6 from the San Felices quarry in Haro (Rioja - Spain) | 100. |
| Water content of the Sand 0/6 | 4.4 |
| Added water | 7.0 |
| Breaker (cement) | 0.5 |
| Retarder | 1.8 |
| Emulsion 2 (i.e. residual bitumen 7.7) | 12.8 |

The ECFs were assessed by the formulation tests applicable in Spain: fluidity time measured manually, cohesion measured by Benedict's Test according to EN 12274-4, carried out 10, 30 and 60 minutes after mixing the constituents and abrasion resistance according to test EN 12274-5, after curing of the test piece (20 hours at 60° C.).

Typical specifications for this type of formulation are:
- a fluidity time between 30 and 45 seconds, which allows correct use, assessed manually and which makes it possible to control the formula (retarder and breaker content)
- a cohesion at 60 minutes>2 Nm, which ensures a rapid increase in cohesion to allow re-opening to traffic within a short timescale,
- an abrasion loss value of less than 650 g/m$^2$, which ensures good mechanical resistance of the MS.

The results obtained for the above three MS formulae are repeated in the following Table.

|  | Standard | Unit | MS 1 | MS 2 | MS 3 |
| --- | --- | --- | --- | --- | --- |
| note | — | — | reference | according to the invention | according to the invention |
| aggregate | — | — | San Felices | San Felices | San Felices |
| emulsion | — | — | 1 | 2 | 2 |
| emulsifier | — | — | polyamine | cocoamido-propyl betaine | cocoamido-propyl betaine |
| total water |  | pph | 10.4 | 10.4 | 11.4 |
| breaker (cement) |  | pph | 0 | 0 | 0.5 |
| retarder |  | pph | 0.75 | 0.75 | 1.8 |
| fluidity time |  | s | 35 | 45 | 45 |
| cohesion-Benedict Test at 10 min | EN 12274-4 | Nm | 1.5 | 1.7 | 1.9 |
| cohesion-Benedict | EN 12274-4 | Nm | 1.7 | 2.1 | 2.3 |

-continued

|  | Standard | Unit | MS 1 | MS 2 | MS 3 |
|---|---|---|---|---|---|
| Test at 30 min cohesion-Benedict Test at 60 min | EN 12274-4 | Nm | 2.0 | 2.4 | 2.6 |
| abrasion resistance | EN 12274-5 | g/m² | 28 | 59 | 26 |

It is clearly apparent that MS 2 and 3, based on emulsions according to the invention, make it possible to obtain results which are equivalent to the reference formula (MS 1) for abrasion and initial fluidity time, and better for the cohesion measured by Benedict's Test, the threshold of 2 Nm being exceeded after 30 min, i.e. a gain in re-opening to traffic of the order of 30 minutes compared to the reference formula.

EXAMPLE 2

Preparation of Another Cold-Cast Coating Formula for a Wearing Course Usable Either for a New Carriageway or to Renew the Surface Properties of Old Carriageways The formula of MS 1 of the previous example was compared with another microsurfacing formula which was identical except that the bitumen emulsion had been replaced by an emulsion 3, with another amphoteric emulsifier according to the invention, cocoamidopropyl hydroxysultaine (CAS: 70851-08-0).

| Emulsion 3 (composition by mass): | |
|---|---|
| Nynas bitumen 70/100 | 59.5 |
| cocoamidopropyl hydroxysultaine (CAS: 70851-08-0) | 0.4 |
| Water qsf | 100. |

| MS 4 (composition by mass): | |
|---|---|
| Sand 0/6 from the San Felices quarry in Haro (Rioja - Spain) | 100.0 |
| Water content of the Sand 0/6 | 4.4 |
| Added water | 6.0 |
| Retarder | 0.8 |
| Emulsion 3 (i.e. residual bitumen 7.7) | 12.9 |

Furthermore, the MS formula was modified by addition of a low Portland cement content which acts in a standard fashion as a breaker, and the following formula was also compared:

| MS 5 (composition by mass): | |
|---|---|
| Sand 0/6 from the San Felices quarry in Haro (Rioja - Spain) | 100.0 |
| Water content of the Sand 0/6 | 4.4 |
| Added water | 7.0 |
| Breaker (cement) | 0.5 |
| Retarder | 1.3 |
| Emulsion 3 (i.e. bitumen residue 7.7) | 12.9 |

As in Example 1, the ECFs were assessed by the formulation tests applicable in Spain: fluidity time measured manually, cohesion measured by Benedict's Test according to EN 12274-4, carried out 10, 30 and 60 minutes after mixing the constituents and abrasion resistance according to test EN 12274-5, after curing of the test piece for 20 hours, 60° C.). The results obtained for the above three formulae for MS are repeated in the following Table.

|  | Standard | Unit | MS 1 | MS 4 | MS 5 |
|---|---|---|---|---|---|
| note | — | — | reference | according to the invention | according to the invention |
| aggregate | — | — | San Felices 1 | San Felices 3 | San Felices 3 |
| emulsion | — | — | polyamine | cocoamido-propyl hydroxy-sultaine | cocoamido-propyl hydroxy-sultaine |
| emulsifier |  |  |  |  |  |
| total water | pph |  | 10.4 | 10.4 | 11.4 |
| breaker (cement) | pph |  | 0 | 0 | 0.5 |
| retarder | pph |  | 0.75 | 0.8 | 1.3 |
| fluidity time | s |  | 35 | 30 | 30 |
| cohesion-Benedict Test at 10 min | EN 12274-4 | Nm | 1.5 | 2.0 | 1.9 |
| cohesion-Benedict Test at 30 min | EN 12274-4 | Nm | 1.7 | 2.4 | 2.3 |
| cohesion-Benedict Test at 60 min | EN 12274-4 | Nm | 2.0 | 2.7 | 2.6 |
| abrasion resistance | EN 12274-5 | g/m² | 28 | 20 | 110 |

It is clearly apparent that MS 4 and 5, based on amphoteric emulsions, make it possible to obtain results which are equivalent to the reference formula (MS 1) for abrasion and initial fluidity time, and better for cohesion measured by Benedict's Test, the threshold of 2 Nm being exceeded after 30 minutes (MS 5), or even after 10 minutes for the formula MS 4, i.e. a gain in re-opening to traffic of the order of 30 to 50 minutes compared to the reference formula.

EXAMPLE 3

Preparation of Another Cold-Cast Coating Formula for a Wearing Course Usable Either for a New Carriageway or to Renew the Surface Properties of Old Carriageways The formula MS 5 of the previous example was repeated with another aggregate, sand 0/6 from the Bureba quarry (province of Burgos). This formula also corresponds to a microsurfacing covered by the Spanish specifications LB-3.

Emulsion 3 of the previous example was used.

| MS 6 (composition by mass): | |
|---|---|
| Sand 0/6 from the Bureba quarry (Burgos - Spain) | 100.00 |
| Water content of the Sand 0/6 | 3.30 |
| Added water | 7.00 |
| Breaker (Cement) | 0.50 |

-continued

| MS 6 (composition by mass): | |
|---|---|
| Retarder | 1.55 |
| Emulsion 3 | 12.90 |
| (i.e. residual bitumen 7.7) | |

As in Examples 1 and 2, the MS were assessed by the formulation tests applicable in Spain: fluidity time measured manually, cohesion measured by Benedict's Test according to EN 12274-4, carried out 10, 30 and 60 minutes after mixing the constituents and abrasion resistance according to test EN 12274-5, after curing of the test piece for 20 hours at 60° C. The results obtained, compared to those of MS 1 and 5 of the above examples are repeated in the following Table.

| | Standard | Unit | MS 1 | MS 5 | MS 6 |
|---|---|---|---|---|---|
| note | — | — | reference | according to the invention | according to the invention |
| aggregate | — | — | San Felices 1 | San Felices 3 | La Bureba 3 |
| emulsion | — | — | | | |
| emulsifier | — | — | polyamine | cocoamido-propyl hydroxy-sultaine | cocoamido-propyl hydroxy-sultaine |
| total water | | pph | 10.4 | 11.4 | 10.3 |
| breaker (cement) | | pph | 0 | 0.5 | 0.5 |
| retarder | | pph | 0.75 | 1.3 | 1.55 |
| fluidity time | | s | 35 | 30 | 35 |
| cohesion-Benedict Test at 10 min | EN 12274-4 | Nm | 1.5 | 1.9 | 2.1 |
| cohesion-Benedict Test at 30 min | EN 12274-4 | Nm | 1.7 | 2.3 | 2.3 |
| cohesion-Benedict Test at 60 min | EN 12274-4 | Nm | 2.0 | 2.6 | 2.6 |
| abrasion resistance | EN 12274-5 | g/m² | 28 | 110 | 211 |

It is clearly apparent that MS 6, based on an amphoteric emulsion according to the invention and La Bureba aggregates, makes it possible to obtain results which are equivalent to the reference formula (MS 1) and to the formula with San Felices aggregate for the abrasion and initial fluidity time, and better for the cohesion measured by Benedict's Test, the threshold of 2 Nm being exceeded after 10 min, i.e. a gain in reopening to traffic of the order of 50 minutes in comparison with the reference formula.

EXAMPLE 4

Preparation of a Cold Recycled Coating Usable as a Base Course

A reference emulsion 3 was produced with a commercial emulsifier Asfier 218 supplied by Kao, and a bitumen sourced from the Petrogal refinery in Sines, Portugal.

This emulsion was compared with emulsions 4 and 5, produced according to the invention, emulsion 4 with another emulsifier according to the invention, a cocoamphoacetate (CAS: 68650-39-5), and emulsion 5 being produced with the emulsifier cocoamidopropyl betaine shown in Example 1.

Thus the formulae below were produced:

| Emulsion 4 (composition by mass): | |
|---|---|
| Petrogal bitumen 70/100 | 59.5 |
| Asfier 218 | 0.6 |
| Hydrochloric acid | 0.4 |
| Water qsf | 100. |

| Emulsion 5 (composition by mass): | |
|---|---|
| Petrogal bitumen 70/100 | 60.0 |
| cocoamphoacetate (CAS: 68650-39-5) | 0.6 |
| Water qsf | 100. |

| Emulsion 6 (composition by mass): | |
|---|---|
| Petrogal bitumen 70/100 | 59.5 |
| cocoamidopropyl betaine (CAS: 70851-07-9) | 0.6 |
| Water qsf | 100. |

These emulsions were used with an aggregate, within the meaning of French standard XP P98-135, obtained by milling the top 10 cm of an old carriageway, the A-494 in the province of Huelva (Andalusia—Spain). The aggregate comprises 3.6 pph of old bitumen. The grading distribution of the crude milling aggregate was as follows:

| | sieve (mm) | | | | | | | |
|---|---|---|---|---|---|---|---|---|
| | 25 | 20 | 12.5 | 8 | 4 | 2 | 0.5 | 0.25 | 0.063 |
| undersize (%) | 100 | 95.5 | 82 | 57 | 29 | 14 | 1 | 0.4 | 0.1 |

The aggregate is mixed using a laboratory mixer with 3.3 pph of emulsion (in relation to the dry milled material) with a total water content of 4.5 pph and breaker (cement) at the level of 0.5 pph in order to obtain the following recycled coating formulae:

| Coating 1 | |
|---|---|
| aggregate | 100 parts by mass |
| emulsion 4 | 3.3 |
| breaker (cement) | 0.5 |
| added water | 2.0 |

| Coating 2 | |
|---|---|
| aggregate | 100 parts by mass |
| emulsion 4 | 3.3 |
| breaker (cement) | 0.5 |
| added water | 2.0 |

| Coating 3 | |
|---|---|
| aggregate | 100 parts by mass |
| emulsion 5 | 2.5 |
| breaker (cement) | 0.5 |
| added water | 2.0 |

The mechanical tests carried out in accordance with standard ASTM D 1075, and quantified by the compression resistance at ambient temperature (R) and the compression resistance at ambient temperature but after immersion for 24 hours in water at 60° C. (r) are given in the table below. Furthermore, they are expressed in terms of retained strength (r/R ratio).

In order to quantify the increase in cohesion for which there is no standardized procedure, the compression resistance after 1 day and at ambient temperature was also measured.

|  | Standard | Units | Coating 1 | Coating 2 | Coating 3 |
|---|---|---|---|---|---|
| note | — | — | reference | according to the invention | according to the invention |
| emulsion |  | nature | emulsion 4 | emulsion 5 | emulsion 6 |
| emulsion |  | pph | 2.5 | 2.5 | 2.5 |
| breaker |  | pph | 0.5 | 0.5 | 0.5 |
| R 1 day ambient | — | MPa | 2.1 | 2.4 | 2.3 |
| R 7 day ambient | ASTM D 1075 | MPa | 4.3 | 4.7 | 4.4 |
| R 7 day immersion | ASTM D 1075 | MPa | 3.3 | 3.2 | 3.3 |
| r/R |  | % | 75.5 | 68.8 | 73.6 |

The invention claimed is:

1. Paving composition consisting essentially of:
   i) 0.5 to 30% by weight of a bitumen emulsion consisting of:
      (a) 0.1 to 3% by weight of an amphoteric surfactant chosen from the compounds of formula (I) or (II)

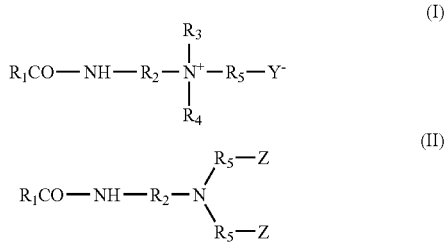

in which:
   $R_1$ is a linear or branched, saturated or unsaturated aliphatic group having 6 to 24 carbon atoms;
   $R_2$ is a linear or branched, saturated or unsaturated aliphatic group having 2 to 6 carbon atoms, at least one of these carbon atoms optionally being substituted by a hydroxy group;
   $R_3$ and $R_4$ are linear or branched saturated or unsaturated aliphatic groups comprising from 1 to 4 carbon atoms, wherein $R_3$ and $R_4$ may be identical or different;
   $R_5$ is a linear or branched saturated or unsaturated aliphatic groups comprising from 1 to 6 carbon atoms, at least one of these carbon atoms optionally being substituted by a hydroxy group;
   Y is an $SO_3^-$ or $COO^-$ group;
   Z is an $SO_3^-$ or $COO^-$ or OH group;
   b. from 30 to 95% bitumen; and
   c. water in sufficient quantity to make up the emulsion;
   ii) from 70 to 99.5% by weight of aggregates;
   iii) from 0 to 20% by weight of total water.

2. Paving composition according to claim 1, wherein the bitumen emulsion is between 2 and 15% by weight of the weight of the paving composition.

3. Paving composition according to claim 1, wherein the aggregates are between 85 to 98% by weight of the weight of the paving composition.

4. Paving composition according to claim 1, wherein the amphoteric surfactant is present in said bitumen emulsion in a quantity of between 0.5 to 1.5% by weight of the bitumen emulsion.

5. Paving composition according to claim 1, wherein the bitumen is present in said bitumen emulsion in a quantity of between 45 and 80% by weight of bitumen emulsion.

6. Paving composition according to claim 1, wherein $R_1$ is a mixture of aliphatic groups derived from coconut oil.

7. Paving Composition according to claim 1, wherein $R_2$ is a linear group with 3 saturated carbons.

8. Paving composition according to claim 1, wherein $R_3$, $R_4$, or $R_5$ represents a methyl or ethyl radical.

9. Paving composition according to claim 1, wherein the amphoteric surfactant is one of cocoamidopropyl betaine, cocoamidopropyl hydroxysultaine or cocoamphoacetate sodium salt.

10. The paving composition according to claim 1 wherein the amount of water is from 1 to 15% by weight of the emulsion.

* * * * *